Figure 1:
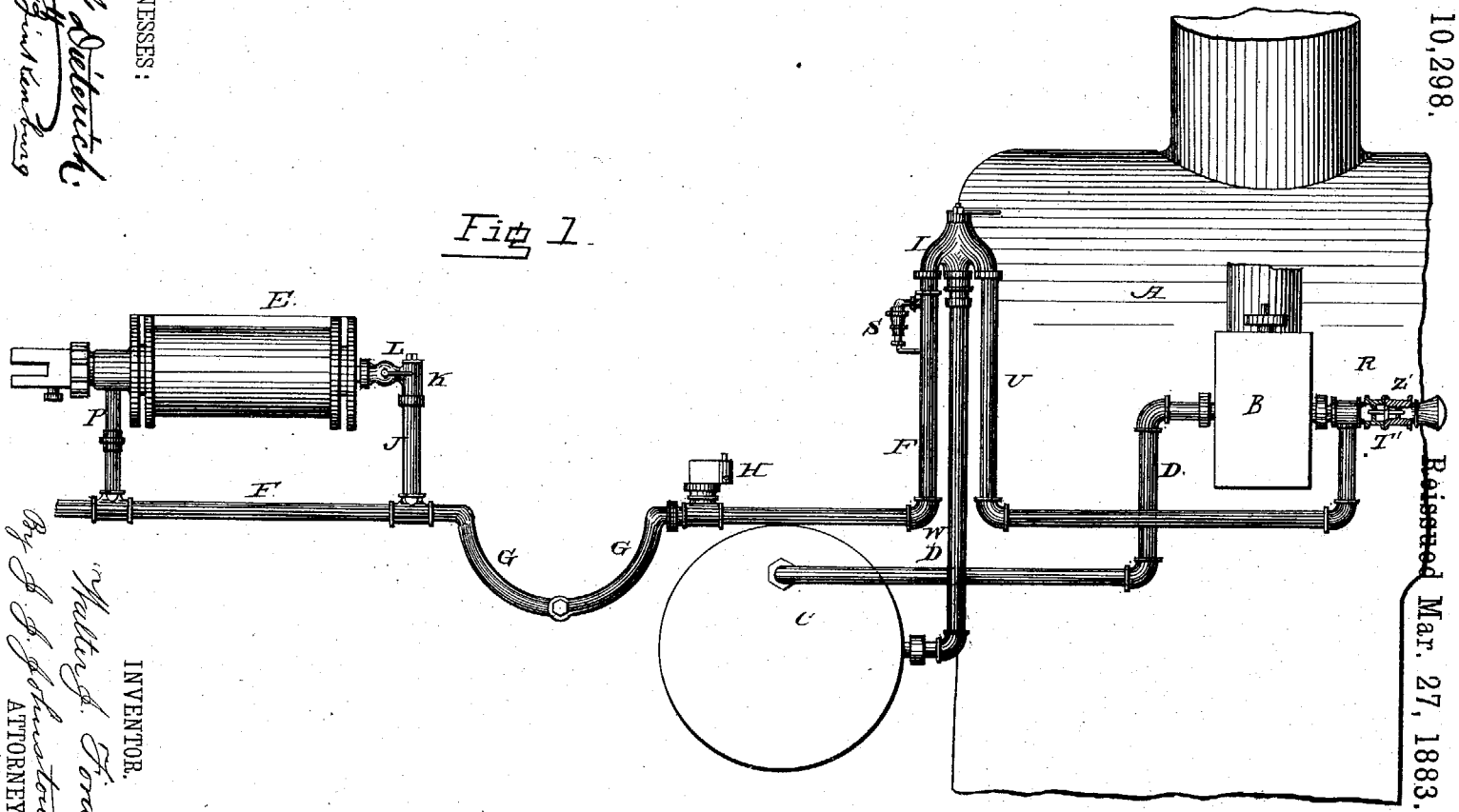

5 Sheets—Sheet 1.

W. J. FORD.

AUTOMATIC AIR BRAKE FOR RAILWAY CARS.

No. 10,298. Reissued Mar. 27, 1883.

WITNESSES:

Fred. G. Dieterich.

Geo Binstenburg

INVENTOR.

Walter J. Ford

By J. J. Johnston

ATTORNEY

THE NORRIS PETERS CO., WASHINGTON, D. C.

W. J. FORD.

AUTOMATIC AIR BRAKE FOR RAILWAY CARS.

No. 10,298. Reissued Mar. 27, 1883.

WITNESSES:

Fred. L. Dieterich.

Geo Binkenburg

INVENTOR.

Walter J. Ford

By J. A. Johnston

ATTORNEY

THE NORRIS PETERS CO., WASHINGTON, D. C.

W. J. FORD.

AUTOMATIC AIR BRAKE FOR RAILWAY CARS.

No. 10,298. Reissued Mar. 27, 1883.

WITNESSES:

Fred. L. Dieterich

Geo Binkenburg

INVENTOR.

Walter J. Ford

By J. J. Johnston

ATTORNEY

THE NORRIS PETERS CO., WASHINGTON, D. C.

W. J. FORD.

AUTOMATIC AIR BRAKE FOR RAILWAY CARS.

No. 10,298. Reissued Mar. 27, 1883.

WITNESSES:

Fred. L. Dieterich

Geo Binkenburg

INVENTOR.

Walter J. Ford

By J. J. Johnston

ATTORNEY

THE NORRIS PETERS CO., WASHINGTON, D. C.

W. J. FORD.
AUTOMATIC AIR BRAKE FOR RAILWAY CARS.
No. 10,298. Reissued Mar. 27, 1883.
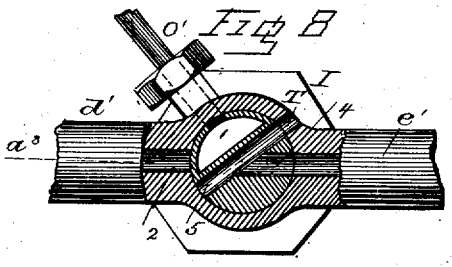
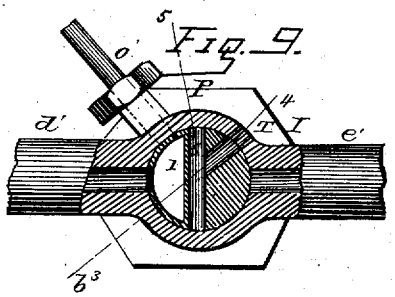
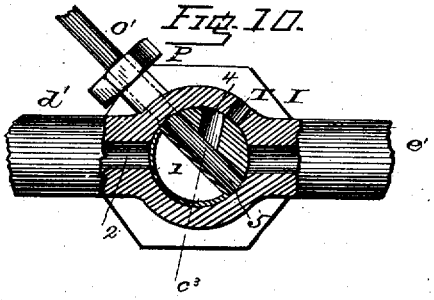
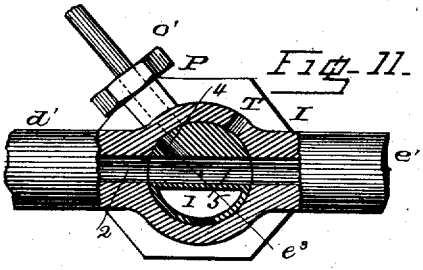
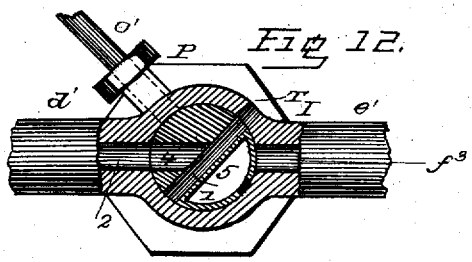
WITNESSES:
Fred. G. Dieterich.
Geo Binkenburg
INVENTOR.
Walter J. Ford
By J. J. Johnston
ATTORNEY
THE NORRIS PETERS CO., WASHINGTON, D. C.

UNITED STATES PATENT OFFICE.

WALTER J. FORD, OF CONCORD, TENNESSEE.

AUTOMATIC AIR-BRAKE FOR RAILWAY-CARS.

SPECIFICATION forming part of Reissued Letters Patent No. 10,298, dated March 27, 1883.

Original No. 266,684, dated October 31, 1882. Application for reissue filed February 5, 1883.

*To all whom it may concern:*

Be it known that I, WALTER J. FORD, of Concord, in the county of Knox and State of Tennessee, have invented a new and useful Improvement in Automatic Air-Brakes for Railway-Cars; and I do hereby declare the following to be a full, clear, and exact description of the same, reference being had to the accompanying drawings and the letters of reference marked thereon.

In the known improvements in automatic air-brakes for railway-cars experience has demonstrated that they are deficient in the following particulars: first, in economy of construction and simplicity of operation; second, in that their construction and operation are so complex as not to be adapted to the skill and intelligence of the ordinary "train-man;" third, in not being adapted to safe and certain manipulation of the brakes when the train is in motion on varying grades at different altitudes; fourth, in not being able to apply the brakes and release them without a jerking and jarring of the train and its braking mechanism; fifth, in not having at all times and under all conditions when the train is in motion a sufficient supply of compressed air to apply or release the brakes to meet any emergency the train may be subjected to; sixth, in not being able to maintain a maximum of force for manipulating the brakes; seventh, in subjecting the air-compressing mechanism and valves connected therewith to undue wear by the induction of dust and gritty matter into the air-compressor, air-reservoir, and into and through the valve-chambers, and around the valves and their seats; eighth, in undue waste of the compressed air and of the power employed for compressing it.

My invention has for its object the overcoming of the disadvantages due to the foregoing-recited deficiencies in air-brakes; and it consists in the method of operating such brakes, as hereinafter described, to wit: compressing air and transmitting it to the brake-cylinder, wherewith to apply the brakes, and subsequently returning the compressed air back to the air-compressing mechanism for reuse, maintaining a maximum of pressure of air in the train-pipe, balancing the piston of the air-cylinder, and controlling the distribution of the compressed air to the air-cylinders and its return back to the air-compressing mechanism, and causing it to rapidly escape, in case of any sudden emergency, at the will of the operator, which method and its advantages and the means for carrying it into effect will hereinafter more fully and at large appear.

To enable others skilled in the art with which my invention is most nearly connected to make and use it, I will proceed to describe its construction and operation.

Figure 2:
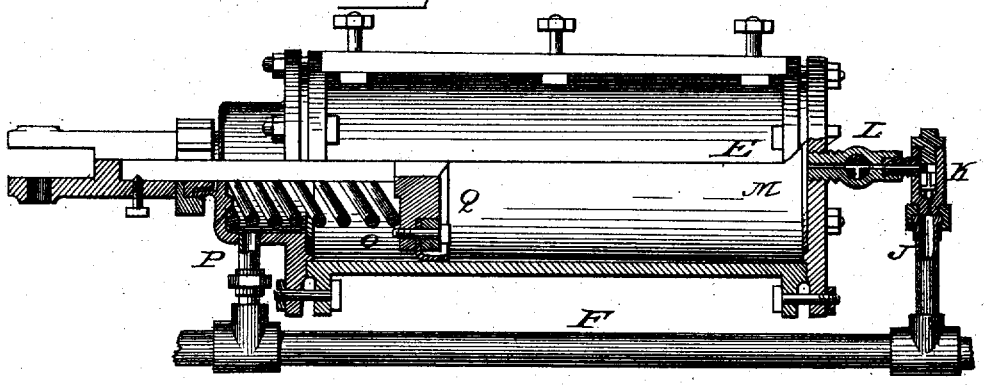
Figure 3:
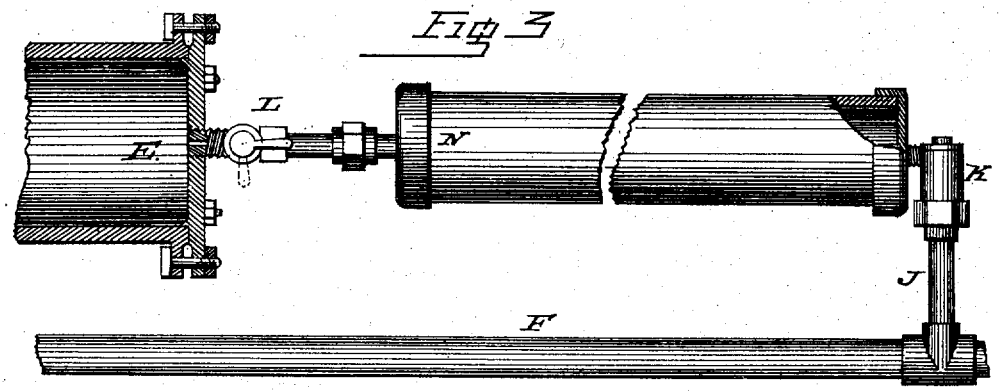
Figure 4:
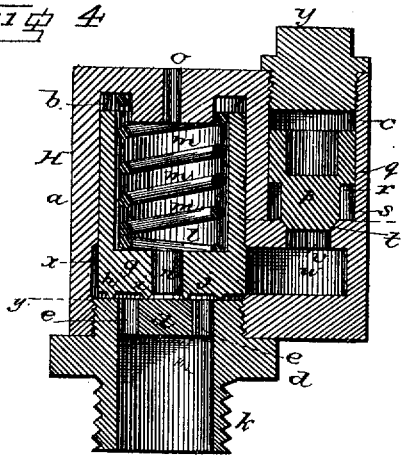
Figure 5:
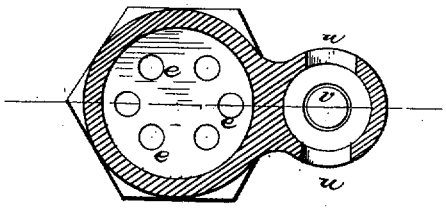
Figure 6:
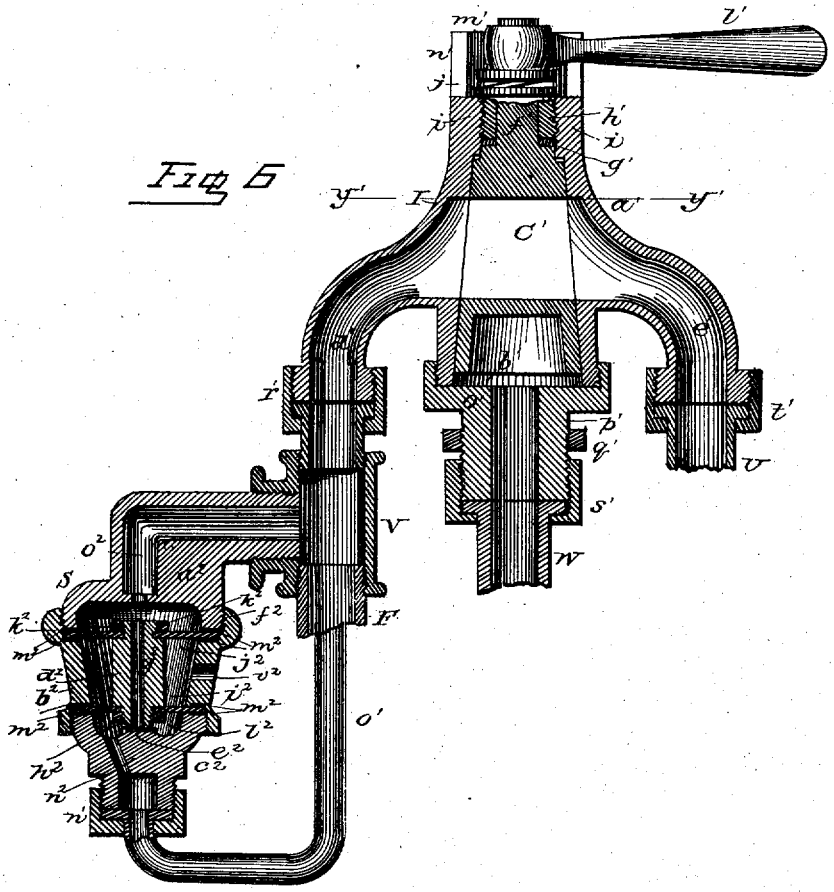
Figure 7:
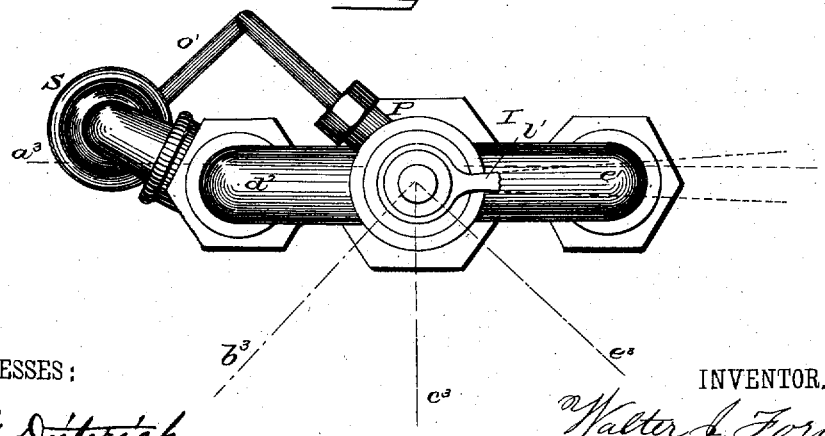

In the accompanying drawings, which form part of this specification, Figure 1 is a side elevation of my improvement in automatic air-brakes for railway-cars. Fig. 2 is a side view of the air or brake cylinder and train-pipe, represented partly in section. Fig. 3 represents a section of the brake-cylinder, train-pipe, and an auxiliary air-reservoir connected therewith. Fig. 4 is a vertical section of the relief-valve. Fig. 5 is a transverse section of the same at line *y y* of Fig. 4. Fig. 6 is a vertical section of the control-valve and its check-valve. Fig. 7 is a top view of the control-valve and check. Figs. 8, 9, 10, 11, and 12 are horizontal sections at line *y' y'* of Fig. 6, representing the various positions of the ports of the valve in the operating of it.

Reference being had to the accompanying drawings, A represents the locomotive steam-boiler, B the air-compressing mechanism, C the reservoir for the compressed air, D the pipe which connects the air-compressing mechanism with said reservoir, E the air or brake cylinder, F the train-pipe, and G G the couplings of said pipe, all of which parts are of ordinary construction and operation, and are arranged with relation to each other, and secured on the locomotive and cars in the usual manner; but combined with said parts is a relief-valve, H, and control-valve I, of peculiar construction and operation, and also check-valves, whereby I am enabled to reuse the compressed air, maintain a maximum of pressure of air in the train-pipe, balance the piston of the brake-cylinder, and control the distribution of the compressed air.

The construction of the air or brake cylinder E and its connection with the train-pipe F are clearly shown in Fig. 2, which also represents the branch pipe J of the train-pipe F, provided with a check-valve, K, having a three-way stop-cock interposed between it and cylinder E, and communicating therewith, for exhausting the air from cylinder E, when required in making up trains, or to prevent the action of the brakes on any car of the train. In some cases it may be desirable to connect the end M of cylinder E with an auxiliary reservoir to increase its capacity and adapt it to heavy cars, in which case the auxiliary air-reservoir is arranged between the three-way stop-cock L and the check-valve K, as shown in Fig. 3. The spring end O of the brake-cylinder E also communicates with the train-pipe F by the branch P. The piston Q of the brake-cylinder is connected with the brake mechanism in the usual manner.

The operation of the brakes through the medium of the apparatus just described is as follows: Compressed air, being admitted into the train-pipe F from the reservoir C on the locomotive, passes into reservoir end M of brake-cylinder E through branch J and check-valve K, and also into end O of the cylinder through branch P, thus acting on both sides of piston Q with equal pressure. The brakes will therefore be released and held off by the spring O. If, now, the air-pressure in train-pipe F be reduced, either by the engineer or by the train parting, the pressure in end O of the brake-cylinder is also reduced, while such reduction is prevented in end M of the brake-cylinder by the action of the check-valve K, and the brakes will be applied by the difference of pressures in each end of the cylinder, which difference may be varied to suit all circumstances, the air from end O of the cylinder being returned to the compressor for reuse, and the air in end M of the cylinder retained, and continually reused without loss except by leakage.

The relief-valve H (represented in Figs. 4 and 5) is for the purpose of maintaining the maximum of air-pressure in the train-pipe F, and consists of a case, *a*, having valve-chambers *b c*, chamber *b* having a base, *d*, with a series of openings, *e*, therein, said base being secured in the case *a* by means of screw-threads *f*, which base forms a rest for the main valve *g*, having a double seat, *h* and *i*, forming an annular space, *j*, which is directly over the openings *e* in the base *d*, which base, by means of screw-threads *k*, is secured in the train-pipe, as shown in Fig. 1. The valve *g* is fitted in the chamber *b* so that it will move easily, yet so that but little air will escape around its periphery. In a cavity, *l*, in the valve *g* is placed a spiral spring, *m*, for loading the valve to working-pressure by tension just sufficient to balance the pressure of air acting on the annular space *j* of the main valve *g*. In the valve *g* is an opening, *n*, which communicates with the cavity *l*, and in the upper end of the case *a* is an opening, *o*. In the chamber *c* is fitted a valve, *p*, so that but little air can escape around its periphery at *q*, said valve being made smaller, at *r*, in diameter, so as to form an annular recess, *s*, above its seat *t*, which recess communicates with openings *u u* in the case *a*. (Shown in Fig. 5.) In the seat of the valve *p* is an opening, *v*, which communicates with a cavity, *w*, which communicates with an annular recess, *x*, in the case *a*, surrounding the lower part of the main valve *g*. The chamber *c* is provided with a screw-cap, *y*, in which is an opening, to allow any air to escape which may leak around valve *p*.

The operation of the relief-valve H is as follows: As soon as the working-pressure is attained or exceeded in the train-pipe F the air admitted through the openings *e* leaks through the seat *i* and aperture *n* to the upper side of the valve *g*, and thence escapes to the atmosphere through the opening *o*. At the same time air leaks through the seat *h*, and since the exits *v u* are closed by the valve *p*, and the main valve *g* is fitted in the chamber *b* so that but little air can escape around its periphery, it is confined, and, acting on a larger area of the main valve than the annular space *j*, for which the spring *m* was adjusted, the main valve *g* is thereby raised, a portion of the air escaping through the openings *n* and *o*; but the valve *p* not being loaded to sustain a greater pressure than a leak, it is also raised from its seat, and the greater portion of the air escapes through the space *x w* and the openings *v u u*, thus providing a rapid exit; and as the opening *o* is smaller than the opening *n*, more air can pass through *n* than can escape through *o*. The pressure on the top of the main valve *g* is thus increased, while the pressure on the bottom is decreased by its rapid escape through the openings *v u u*. The closing of the valve at the pressure determined on is thus secured to any degree of accuracy required by the relative sizes of the openings *n* and *o*.

I do not claim the relief-valve H herein shown and described, but reserve the right to make it the subject-matter of another application for Letters Patent of the United States.

The control-valve I communicates with the train-pipe F, inlet-pipe R of the air-compressor B, and reservoir C, and is furnished with a check-valve, S, for maintaining a less pressure in the train-pipe F than in the reservoir C. The said control-valve is employed for the purpose of operating the brakes, applying them by returning the compressed air from the end O of the brake-cylinder E, through the train-pipe F, to the inlet-pipe R, (provided with a check-valve, T′, opening inward,) and through it to the air-compressor B, which forces it through the pipe D into the reservoir C, from which it again passes through the pipe W to the control-valve I, and thence to the train-pipe and end O of the brake-cylinder to release the brake. The operator can also by said control-valve cause the compressed air in the end O of the brake-cylinder to escape to the atmosphere, thus applying the brakes rapidly in case of sudden emergency. The operator can also by said valve so regulate the amount of air returned from the brake-cylinder to the compressor, or from reservoir C to the brake-cylinder, that the brakes may be graduated to control the speed of the train as desired.

The control-valve consists of a case, $a'$, having a valve-chamber, $b'$, for the coniform or plug valve $c'$, and two ways, $d'$ and $e'$. On the stem of the valve $c'$, resting on a shoulder, is a washer, $g'$. The stem $f'$ is fitted in a sleeve-nut, $h'$, in the neck $i'$, on which sleeve-nut $h'$ is a lock or jam nut, $j'$, for securing the nut $h'$ in its adjusted position, and the washer $g'$ and nut $h'$ are for the purpose of adjusting the valve $c'$ in its chamber $b'$ for avoiding undue friction. On the upper end of the stem $f'$ of the valve $c'$ is secured a lever or handle, $l'$, for operating the valve. A part of the neck $i'$ of the case $a'$ is cut away, so as to leave a segment, $m'$, the vertical faces $n'$ of which serve as stops for the lever $l'$. On the lower end of the valve-chamber $b'$ is a cap, $o'$, which may be supported by a bracket at $p'$, arranged in any convenient position and secured by the nut $q'$.

To the way $d'$ of the control-valve I is attached the train-pipe F by means of a union-nut, $r'$, and to the cap $o'$ is attached a pipe, W, by a union-nut, $s'$, which communicates with a reservoir, C, and to the way $e'$ is attached, by means of a union, $t'$, a pipe, U, which communicates with the inlet air-pipe R of the air-compressor B.

In order to store more air in the reservoir C of limited capacity, and also that the brakes in a long train may be more quickly released by increasing the velocity of the air by increasing its pressure, I employ a double diaphragm check-valve, S, which is constructed as follows: Its case is constructed in three parts, $a^2$, $b^2$, and $c^2$, secured together as indicated at $f^2$. The valve $d^2$ has an opening, $g^2$, through its axis, and has secured to it, by means of nuts $k^2$ and $l^2$, two diaphragms, $i^2$ and $j^2$, constructed of thin metal or other suitable material. The peripheries of said diaphragms are secured air-tight by a gum washer in the joints of the case $b^2$. The seat $h^2$ of the valve is an annular ring or end of a short cylinder, so that it will not increase in size or require readjustment for wear. It rests upon the seat $e^2$ (which may be a disk of leather) of the part $c^2$ of the case. In the part $b^2$ of the case is an opening, $v^2$, to the atmosphere, to provide an escape for any possible leakage through or around the diaphragms $i^2$ and $j^2$. The part $a^2$ has a port, $o^2$, and the part $c^2$ has a port, $n^2$. The part $a^2$ is screwed into a T-coupling, V, on the train-pipe, and to the part $c^2$ is attached, by means of a union nut, $n'$, the lower end of the pipe O', the upper end of which communicates with the control-valve at P, as shown in Figs. 7 to 12, inclusive.

The operation of the check-valve S is as follows: Air enters from the pipe O' through the port $n^2$ to the under side of the diaphragm $i^2$, thereby operating and raising the valve $d^2$ from its seat, and then passes through the port $g^2$ to the upper side of the diaphragm $j^2$, and through port $o^2$ to the train-pipe F. When the air-pressure in the train-pipe F multiplied by the area of the diaphragm $j^2$ is less than the air-presssure in the reservoir C multiplied by the area of the diaphragm $i^2$, the valve $d^2$ will rise and allow the air to flow from the reservoir C to the train-pipe F until the larger diaphragm, $j^2$, with less pressure balances the smaller diaphragm, $i^2$, with a greater pressure, so that the pressure in the reservoir C will exceed that in the train-pipe F inversely as the areas of the diaphragms acted on, and the diaphragms may be made any size to produce any desired difference of pressure.

The operation of the control-valve is as follows: When the lever-handle $l'$ is in the position indicated by the dotted line marked $a^3$, Fig. 7, that will be its position when the train is in motion. The port 1 in the valve $c'$ is always in communication with the reservoir C by way of the pipe W, and is now also in connection with the pipe O', leading to the bottom of the check-valve S, and feeding air into the train-pipe F whenever the pressure within it plus that due to the action of the valve $d^2$ is less than the pressure in reservoir C, thus supplying automatically the loss of air by leakage throughout the train while in motion. When the lever $l'$ is in the position indicated by the dotted line $b^3$ in Fig. 7 port 1 of the valve $c'$ communicates with the large port 2 in the case $a'$ of the control-valve I, as shown in Fig. 9, leading to and filling the train-pipe F with compressed air from the reservoir C, which, entering the end O of the brake-cylinder E, releases the brake. The lever $l'$ is then moved to the position $a^3$ to maintain the air-pressure in the train-pipe. When the lever $l'$ is in the position indicated by the dotted line $e^3$, Fig. 7, the ports in the valve $c'$ will be in the position shown in Fig. 11, in which position communication with reservoir C through port 1 is cut off, and direct communication opened between the pipe U, communicating with the pipe R of the air compressing mechanism, and the train-pipe F, through which the compressed air in the end O of the brake-cylinder will return, and by its own pressure will rush into the inlet-pipe R and through the induction-valves of the air-compressor, closing the check-valve T', which prevents the escape of the returning compressed air through the screen-nozzle Z of the inlet-pipe R. The air is then returned by the air-compressor by the pipe D to the reservoir C for reuse. The brakes are now fully applied, and thus the compressed air can be used over and over again continually. This method of reusing the air will be very advantageous on railways of sandy districts of country by avoiding, to a great extent, drawing into the brake mechanism and air-compressor sand, dust, and gritty mattters, which clog and unduly wear the valves, pistons, and chambers forming part of said mechanism. Another very great advantage in not allowing the compressed air to escape after use in the brake-cylinder, as usual, but, in contradistinction thereto, returning it to the air-compressing mechanism for reuse, consists in the fact that it adapts my improvements in automatic air-brakes equally well for the plains and the longest and steepest grades at the highest altitudes at which railways are or may be constructed.

The efficiency of the air-brakes hitherto known has been found to be less and the difficulty of operating them greater as the altitude increases, owing to the rarity of the atmosphere, it being evident that the number of strokes of the air-compressor to compress a given amount of air must be inversely as the height of the barometrical column, and as the greatest altitudes are always associated with the most dangerous and longest gradients the necessity has arisen for some method by which the air-reservoir cannot be exhausted, and to have at all times a sufficient supply of compressed air in the brake-cylinders and air-reservoir for constant manipulation of the brakes on varying downgrades without loss of air, or for use in sudden emergency. These conditions and requirements are fully and efficiently provided for by the method and means hereinbefore described.

When it is necessary to make a quick stop in an emergency the lever $l'$ is moved from $a^3$ to the position $f^3$. The port 4 of the valve $c'$ will then be in communication with the port 2, and the port 5 in communication with the opening T in the case $a'$, as shown in Fig. 12, thereby allowing the compressed air in the train-pipe F and end O of the brake-cylinder E to discharge rapidly into the atmosphere by its own velocity and the pressure of the piston Q behind it, thus applying the brakes rapidly and fully, the same result being attained, in case of the train parting, by the escape of the air by the parted hose.

The graduation of the brake is accomplished thus: When the lever $l'$ is at the position $c^3$ in Fig. 7 all the ports of the valve $c'$ are closed, as shown in Fig. 10. If then, the lever $l'$ is moved to $e^3$ for a second, and then brought back to $c^3$, a little air will be exhausted from the train-pipe and end O of the brake-cylinder E, and the brakes will be applied lightly. A repetition of this process will set them tighter. If the lever $l'$ is allowed to remain at $e^3$, the brakes will be applied full; but if the said lever is moved from $c^3$ to $b^3$ for an instant, and then brought to position $c^3$, the brakes will be eased to a corresponding extent by the admission of air from the reservoir C, through port 1 of the valve $c'$, to the train-pipe F and end O of the brake-cylinder E, and will be so held as long as lever $l'$ remains at the position $c^3$, and thus, through the medium of the control-valve I, the brakes can be graduated on or off to any degree of nicety at the will of the operator.

I am aware that a portion of the compressed air has been axhausted from a brake-cylinder through the medium of a pump and forced into an air-reservoir.

Having thus described my invention, what I claim as new, and desire to secure by Letters Patent, is—

1. In an automatic air-brake for railway-cars, the method of operating the same herein described—viz., compressing the air and transmitting it to the brake-cylinders, and automatically returning the compressed air back to the air-compressing mechanism for reuse, substantially as and for the purpose set forth.

2. In an automatic air-brake for railway-cars, the method of operating the same—viz., compressing air and transmitting it to the brake-cylinders and returning the same to the compressing mechanism for reuse, maintaining a maximum pressure of the compressed air in the train-pipe through the medium of a relief-valve, and controlling the distribution thereof to the brake-cylinders and its return to the compressing mechanism and its rapid escape to the atmosphere in case of emergency by means of a control-valve at the will of the operator, substantially as and for the purpose set forth.

3. An automatic air-brake provided with a valve adapted to control the transmission of compressed air to the brake-cylinder, maintain an equilibrium of pressure therein, and then return the same to the compressing mechanism, substantially as described, and for the purpose set forth.

4. An automatic air-brake provided with a valve adapted to control the transmission of compressed air to the brake-cylinder, balance the piston therein, and in an emergency to suddenly relieve the cylinder of pressure and return the air to the compressing mechanism, substantially as herein described, and for the purpose set forth.

5. In an automatic air-brake, the combination of the air-brake cylinder E, valve L, auxiliary reservoir N, check-valve K, and train-pipe F, communicating with air-compressing mechanism, substantially as herein described, and for the purpose set forth.

6. In an automatic air-brake, a control-valve, I, communicating with the train-pipe F, air-reservoir C, and the inlet-pipe R of the air-compressing mechanism B, substantially as herein described, and for the purpose set forth.

7. In an automatic air-brake, a control-valve, I, communicating with the train-pipe F, air-reservoir C, and the inlet-pipe of the air-compressing mechanism B, in combination with the check-valve S and pipe O', substantially as described herein, and for the purpose specified.

8. In an automatic air-brake, the control-valve I, consisting of the case $a$, having ways $d'$ $e'$, opening T, segment of a cylinder, $m'$, having vertical faces $n'$, valve $c'$, having ports 1, 4, and 5, cap $o'$, and adjusting-nut $h'$ and jam-nut $j'$, constructed and arranged substantially as herein described, and for the purpose set forth.

9. In an automatic air-brake, the check-valve

S, the case constructed in three parts, $a^2$ $b^2$ $c^2$, secured together by screw-threads at $f^2$, the part $a^2$ having the port $o^2$, and the part $c^2$ having port $n^2$, part $b^2$ having opening $r^2$, the valve $d^2$, having port $g^2$ and cylindrical seat $h^2$ and nuts $k^2$ $l^2$, and the diaphragms $i^2$ $j^2$, constructed, arranged, and operating substantially as herein described, and for the purpose set forth.

10. In an automatic air-brake, the combination of the control-valve I, train-pipe F, pipe U, inlet-pipe R, having check-valve T′, air-compressing mechanism B, pipe D, and reservoir C, communicating with said control-valve, substantially as herein described, and for the purpose set forth.

11. In an automatic air-brake, the air or brake cylinder E, having the end M, communicating with the train-pipe F through the medium of the branch pipe J, provided with stop-valve L and check-valve K, and the end O communicating with said train-pipe through the medium of branch pipe P, substantially as and for the purpose set forth.

12. In an automatic air-brake, the auxiliary reservoir N, interposed between the check-valve K and stop-valve L, and communicating with the brake-cylinder E and train-pipe F, substantially as described, and for the purpose set forth.

13. In an automatic air-brake, the combination of the brake-cylinder E, control-valve I, train-pipe F, pipe U, inlet-pipe R, having check-valve T′, air-compressing mechanism B, pipe D, and reservoir C, communicating with said control-valve, substantially as herein described, for the purpose set forth.

WALTER J. FORD.

Witnesses:

JAMES J. JOHNSTON,

A. C. JOHNSTON.